US012379392B2

(12) United States Patent
Fukaya et al.

(10) Patent No.: US 12,379,392 B2
(45) Date of Patent: Aug. 5, 2025

(54) SURFACE ANALYSIS DEVICE

(71) Applicant: Hitachi High-Tech Corporation, Tokyo (JP)

(72) Inventors: Ritsuo Fukaya, Tokyo (JP); Yasuhiro Ando, Tokyo (JP); Yoshihiro Isozaki, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 338 days.

(21) Appl. No.: 18/018,613

(22) PCT Filed: Aug. 12, 2020

(86) PCT No.: PCT/JP2020/030669
§ 371 (c)(1),
(2) Date: Jan. 30, 2023

(87) PCT Pub. No.: WO2022/034652
PCT Pub. Date: Feb. 17, 2022

(65) Prior Publication Data
US 2023/0296644 A1  Sep. 21, 2023

(51) Int. Cl.
*G01Q 30/20* (2010.01)
*G01Q 10/06* (2010.01)
*G01Q 30/04* (2010.01)

(52) U.S. Cl.
CPC ............ *G01Q 30/20* (2013.01); *G01Q 10/06* (2013.01); *G01Q 30/04* (2013.01)

(58) Field of Classification Search
None
See application file for complete search history.

(56) References Cited

U.S. PATENT DOCUMENTS 5,200,616 A * 4/1993 Kokawa ................ B82Y 35/00
850/17
6,051,825 A   8/2000 Lindsay et al.
(Continued)

FOREIGN PATENT DOCUMENTS

JP    10-164866 A    6/1998
JP    11-271335 A    10/1999
(Continued)

OTHER PUBLICATIONS

International Search Report (PCT/ISA/210) issued in PCT Application No. PCT/JP2020/030669 dated Oct. 27, 2020 with English translation (six (6) pages).
(Continued)

*Primary Examiner* — Daniel S Larkin
(74) *Attorney, Agent, or Firm* — Crowell & Moring LLP

(57) ABSTRACT

The present invention pertains to a surface analysis device (1) and provides a technology that can increase accuracy and quality of measurement and analysis even when a local deviation is generated in height information of a measurement result of a scanning probe microscope (SPM) (2), due to an atmospheric pressure change with respect to an airtight tank (10). The surface analysis device (1) is provided with: an airtight tank (10); a stage (6) that holds a sample (5) in the airtight tank (10); the SPM (2) that is fixed to a structure configuring the airtight tank (1) and that measures the surface of the sample (5); a sensor (4) that is disposed outside of the airtight tank (10) and that measures atmospheric pressure; and a computer system that analyzes the surface of the sample by using a first signal obtained through measurement by the SPM (2) and a second signal obtained through measurement by the sensor (4).

9 Claims, 11 Drawing Sheets

(56) References Cited

U.S. PATENT DOCUMENTS

| | | | |
|---|---|---|---|
| 9,689,893 B2* | 6/2017 | Ando | G01Q 30/16 |
| 2013/0212749 A1 | 8/2013 | Watanabe et al. | |
| 2021/0080485 A1* | 3/2021 | Yamasaki | G01B 11/24 |

FOREIGN PATENT DOCUMENTS

| | | |
|---|---|---|
| JP | 2000-90871 A | 3/2000 |
| JP | 2004-55300 A | 2/2004 |
| JP | 2005-83852 A | 3/2005 |
| JP | 2006-234500 A | 9/2006 |
| JP | 2012-63158 A | 3/2012 |

OTHER PUBLICATIONS

Japanese-language Written Opinion (PCT/ISA/237) issued in PCT Application No. PCT/JP2020/030669 dated Oct. 27, 2020 (three (3) pages).

* cited by examiner

2a : FIRST PORTION
2b : SECOND PORTION
 4 : SENSOR (ATMOSPHERIC PRESSURE MEASUREMENT ELEMENT)
 5 : SAMPLE (WAFER)
 6 : STAGE (HOLDING TABLE)
 7 : PROBE
10 : VACUUM TANK
10a : UPPER WALL PART
109 : HOUSING
CS2 : COMPUTER SYSTEM (A) CASE OF STANDARD ATMOSPHERIC PRESSURE (B) CASE OF INCREASE IN ATMOSPHERIC PRESSURE

SURFACE ANALYSIS DEVICE

TECHNICAL FIELD

The present invention relates to technology, such as a surface analysis device.

BACKGROUND ART

With the miniaturization of semiconductor integrated circuit elements, or the like, the demand for surface analysis devices and the like is increasing. The surface analysis device has a function of three-dimensionally measuring or observing a fine shape formed on a sample surface by scanning the sample surface with a probe. A scanning probe microscope (SPM) is known as such a surface analysis device. The SPM obtains information about the shape and physical properties of the sample surface by detecting some types of interaction between a probe with an extremely sharp tip and the sample surface. As devices belonging to the SPM, there are known a scanning tunneling microscope (STM) and an atomic force microscope (AFM). The STM uses tunneling current as the interaction. The AFM uses atomic forces as the interactions. These devices measure the distance between the sample surface and the tip of the probe based on the detection of interaction by each method, and convert the distance into height information of the observation point (in other words, a target location on the sample surface). The surface analysis device can output an image representing the three-dimensional shape of the sample surface from information on the scanning position and height.

A scanning electron microscope (SEM) is also known as a charged particle beam device. The SEM can detect secondary electrons and the like from the sample surface based on irradiation of the sample surface with an electron beam and output an image representing the sample surface.

JP2012-63158A (PTL 1) is cited as an example of the related art related to the surface analysis device. In PTL 1, as "a scanning probe microscope and a surface shape measurement method using the same", a highly-accurate displacement device for measuring a vertical movement of a sample stage in a non-driving direction during horizontal scanning on a back side of the sample stage is provided, and it is disclosed that a result of measurement of a surface shape of the sample by a probe is corrected.

CITATION LIST

Patent Literature

PTL 1: JP2012-63158A

SUMMARY OF INVENTION

Technical Problem

In order to improve the degree of integration of semiconductor integrated circuit devices, the device structure is becoming more and more complicated in a height direction. In manufacturing process control, the importance of height direction dimension measurement is increasing in addition to planar structure dimension measurement of the related art. For this reason, adoption of an SPM capable of measuring the height direction is being considered. Furthermore, a configuration in which the SPM, typically the AFM, is incorporated into a device provided with a vacuum tank is being considered. As a device provided with a vacuum tank, there are, for example, a processing device for film formation and a charged particle beam device such, as a SEM.

However, in the related art, in some cases, height information obtained by the measurement in the SPM may be applied with a displacement amount caused by disturbances, device characteristics, and the like as a deviation. An airtight tank, such as a vacuum tank, is influenced by minute atmospheric pressure variation in a space in which the device is installed, usually a clean room. Due to this atmospheric pressure variation, mechanical deformation such, as distortion, occurs in the walls and the like that configure the airtight tank, and displacement occurs in directions including the height direction. Along with the deformation and displacement of the wall surface, the SPM fixed to the wall surface is also displaced in the directions including the height direction. The displacement amount at this time influences the height information of the SPM measurement result as a deviation. Such a deviation in height is not desirable because the deviation degrades the accuracy and quality of the measurement and the analysis in the SPM and surface analysis. Such a deviation in height cannot be dealt with an example in the related art, such as PTL 1.

The present disclosure is to provide technology that can improve accuracy and quality of measurement and analysis of a surface analysis device even in a case where local deviation occurs in the height information of the SPM measurement result due to atmospheric pressure variation in the airtight tank.

Solution to Problem

A representative embodiment of the present disclosure has the following configuration. A surface analysis device includes an airtight tank of which the interior can be decompressed or pressurized, a stage holding a sample within the airtight tank, a scanning probe microscope fixed to a structure configuring the airtight tank and measuring a surface of the sample, a sensor located outside the airtight tank and measuring an atmospheric pressure, and a computer system analyzing the surface of the sample by using a first signal measured by the scanning probe microscope and a second signal measured by the sensor.

Advantageous Effects of Invention

According to a representative embodiment of the present disclosure, regarding the surface analysis device, even in a case where local deviation occurs in the height information of the SPM measurement result due to atmospheric pressure variation in the airtight tank, the accuracy and quality of the measurement and the analysis can be improved.

DESCRIPTION OF EMBODIMENTS

Figure 1:
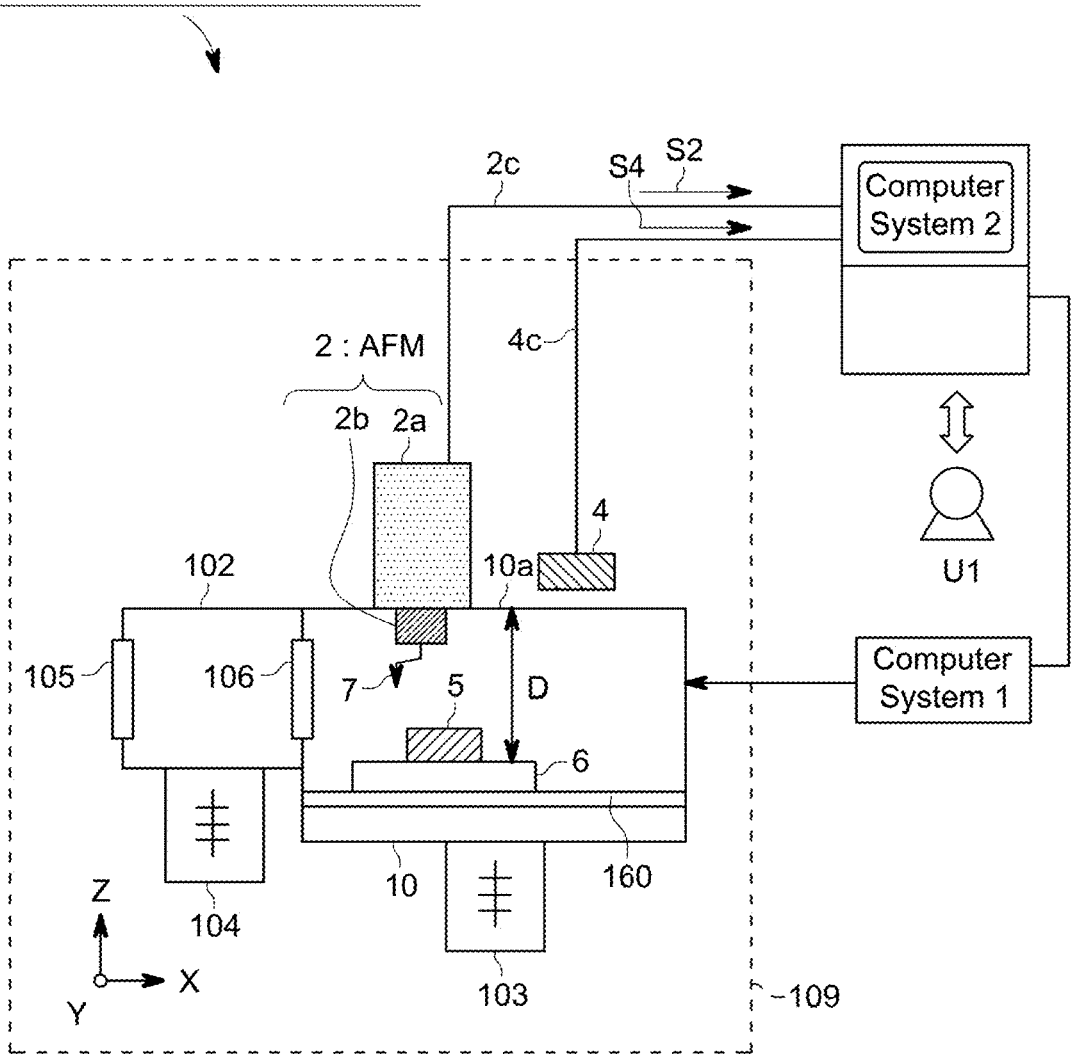
FIG. 1 is a diagram illustrating the overall configuration of a surface analysis device according to a first embodiment of the present disclosure.

Hereinafter, embodiments will be described in detail with reference to the drawings. It is noted that, in principle, the same reference numerals are denoted by the same components in all the drawings, and redundant descriptions are omitted.

First Embodiment

A surface analysis device according to a first embodiment of the present disclosure will be described with reference to FIG. 1. The surface analysis device of the first embodiment is a device having an AFM as an SPM in a vacuum tank and has a function of correcting height information measured by the AFM based on detection of atmospheric pressure variation in the vacuum tank. A surface analysis device 1 (especially, a computer system CS2) of FIG. 1 corrects height information of a surface of a sample 5 in a measurement signal S2 of an AFM2 so as to exclude influence of a displacement of a vacuum tank 10 according to atmospheric pressure variation.

[Surface Analysis Device]

FIG. 1 illustrates the configuration of the surface analysis device 1 according to the first embodiment. The surface analysis device 1 of the first embodiment includes the vacuum tank 10, the AFM2 which is the SPM, a sensor 4, a housing 109, a computer system CS1, the computer system CS2, and the like. A user U1 who is an operator uses the surface analysis device 1 by operating the computer system CS2 and the like. The sample 5 is, for example, a silicon wafer. A control function of the surface analysis device 1 is configured by connecting and cooperating two systems of the computer system CS1 and the computer system CS2. The computer system CS1 is mainly a system for driving and controlling mechanisms, such as the vacuum tank 10 and the like. The computer system CS2 is a system for controlling the AFM2. Each computer system is configured with a computer (for example, a PC, an electronic circuit board, or the like), an input device, an output device, and the like. Portions other than the computer systems CS1 and CS2 in the surface analysis device 1 are accommodated in the housing 109. A space portion which is an exterior of the vacuum tank 10 inside the housing 109 communicates with an exterior of the housing 109 and has an atmospheric pressure. The surface analysis device 1 is installed in a clean room.

It is noted that (X, Y, Z) may be used as a representation of directions and coordinate systems for explanation purposes. The X and Y directions are two perpendicular directions configuring a horizontal plane and correspond to planes of a stage 6 and the sample 5. The Z direction is a height direction, which is perpendicular to the X and Y directions and is a vertical direction. A target of correction is a displacement/deviation at least in the Z direction.

The vacuum tank 10 is an airtight tank of which the interior can be decompressed or pressurized. The vacuum tank 10 becomes a vacuum state during the manufacturing process. The vacuum tank 10 is an airtight tank having an internal pressure of $1\times10^{-2}$ Pa (pascal) or less during the operation. Although the vacuum tank 10 is a rectangular parallelepiped structure in this example, the present invention is not limited thereto. The vacuum tank 10 may be, for example, a structure having an axially symmetrical shape, such as a cylinder. The AFM2 is provided on the wall surface of the vacuum tank 10. In particular, the AFM2 is fixed to an upper wall part 10a (in other words, lid) of the vacuum tank 10. The vacuum tank 10 has the stage 6 which is a holder configured to hold the sample 5. A stage moving mechanism 160 allows the stage 6 to move, for example, in horizontal directions (X and Y directions) in a state where the sample 5 is mounted on the stage 6 and fixed thereto.

The computer system CS1 is connected to the mechanisms, such as the vacuum tank 10 and the like. The computer system CS1 controls, for example, the state of pressure inside the vacuum tank 10 and drives and controls the stage moving mechanism 160. Accordingly, the stage 6 can be moved to a specified position within the vacuum tank 10, and the sample 5 on the stage 6 can be located at a specified position.

The surface analysis device 1 includes a load lock chamber 102, gate valves 105 and 106, and a vacuum pump system 103, and a vacuum pump system 104 for the vacuum tank 10. The load lock chamber 102 is a preliminary disposal chamber for introducing the sample 5 into the vacuum tank 10. Although not illustrated herein, a mechanism, such as a robot for carrying the sample 5 is provided outside the load lock chamber 102. A mechanism for carrying the sample 5, a rotating mechanism for allowing the direction of the sample 5 to be constant, and the like are provided inside the load lock chamber 102. The gate valve 105 communicates between the load lock chamber 102 and the outside atmospheric pressure section. The gate valve 106 connects the load lock chamber 102 to the vacuum tank 10. The vacuum pump system 103 is a vacuum pump system for evacuating the vacuum tank 10 under a reduced pressure. The vacuum pump system 104 is a vacuum pump system for evacuating the load lock chamber 102 under a reduced pressure. The vacuum pump system 103 and the vacuum pump system 104 are configured with a series of pump groups with a turbomolecular pump exhaustable up to low-vibration and ultra-high vacuum states as a final stage. The ultra-high vacuum state is, for example, a state of about $1\times10^{-5}$ Pa.

The AFM2 is a device capable of physically scanning the surface of the sample 5 on the stage 6 by using a probe 7, measuring the height of the target location on the surface of the sample 5, and obtaining an image representing the three-dimensional shape of the surface of the sample 5. The AFM2 has a first portion 2a and a second portion 2b as portions configuring a device. The first portion 2a is a portion located outside the vacuum tank 10 and is located in the atmosphere above the upper wall part 10a of the vacuum tank 10. The second portion 2b is a portion located inside the vacuum tank 10, and is located in a vacuum below the upper wall part 10a of the vacuum tank 10. The first portion 2a and the second portion 2b are joined by penetrating the wall surface of the vacuum tank 10, particularly, a portion of the upper wall part 10a. The penetrating portion is maintained to be airtight by a part or mechanism, such as an O-ring (not illustrated). A portion of the first portion 2a is fixed to the upper wall part 10a. A portion of the second portion 2b is fixed to the upper wall part 10a. Since the AFM2 is fixed to a portion of the wall surface, especially to the upper wall part 10a in this manner, the AFM2 is influenced by the deformation and displacement of the upper wall part 10a.

The probe 7 is provided in the second portion 2b of the AFM2. The AFM2 measures the height of the surface of the sample 5 by scanning the target location of the surface of the sample 5 held on the stage 6 with the probe 7 and obtains an image representing the three-dimensional shape of the surface of the sample 5. This image is, in other words, measurement information having a scanning position in the horizontal direction and height information for each time point. The computer system CS2 is connected to the AFM2 through a signal line 2c. The AFM2 outputs the signal S2 such as an image which is a measurement result to the computer system CS2 through the signal line 2c.

The computer system CS2 receives, as an input, and processes the signal S2 of the measurement result from the AFM2. The computer system CS2 constructs, for example, an image based on the signal S2 and displays the image on a display screen. The surface analysis device 1 analyzes a shape of the surface of the sample 5 based on the processing result of the AFM2.

The sensor 4 is provided outside the vacuum tank 10, for example, at a predetermined position in the vicinity that is not in contact with the upper surface of the upper wall part 10a. The sensor 4 is an atmospheric pressure measurement element that measures the atmospheric pressure outside the vacuum tank 10. Alternatively, the sensor 4 is an element that can measure the pressure applied to the upper wall part 10a of the vacuum tank 10. The sensor 4 outputs a signal S4 of the measured atmospheric pressure. The sensor 4 is connected to the computer system CS2 through a signal line 4c. The computer system CS2 receives, as an input, and processes the signal S4 from the sensor 4. The computer system CS2 calculates the atmospheric pressure variation amount based on, for example, the signal S4. It is noted that the sensor 4 may be any element as long as the sensor can measure a minute variation in the atmospheric pressure. There are several types of elements that can measure the minute variation in atmospheric pressure, and any type of element can be applied as the sensor 4.

It is noted that the arrangement of the sensor 4 is not limited to this example. The sensor 4 is located inside the housing 109, but the present invention is not limited thereto, and the sensor 4 may be located outside the housing 109. The sensor 4 may be located by being fixed to the vacuum tank 10, the housing 109, or the like.

In the first embodiment, an "absolute pressure detection type" atmospheric pressure measurement element is applied as the sensor 4. An "absolute pressure detection type" sensor has an element structure in which a sealed space maintained at a reference pressure and an atmospheric pressure space are separated by a partition wall (in other words, a film). The atmospheric pressure space communicates with the outside (that is, the location where the sensor 4 is provided). This type of sensor electrically detects the variation in the differential pressure between the two spaces as the displacement of the partition (in other words, a change in a distortion amount) by using a semiconductor piezo gauge or the like.

The signal S4 output from the sensor 4 is a voltage signal representing the atmospheric pressure measurement value outside the vacuum tank 10 and is a signal having a voltage value at each time point in time series.

In a modification, a "relative pressure detection type" atmospheric pressure measurement element can be applied to the sensor 4. In this type of sensor, one atmospheric pressure space communicates with the installation location of the sensor 4 as in the element structure of the "absolute pressure detection type". The other space across the partition communicates with a remote exterior, for example, an exterior of the clean room through lines. This sensor can measure a variation in relative differential pressure in both spaces as a displacement of the partition.

[Surface Analysis Procedure]

An example of the procedure for analyzing the surface of the sample 5 by using the surface analysis device 1, particularly the AFM2 is as follows. The surface analysis device 1 first allows the load lock chamber 102 to be in the atmospheric pressure state, opens the gate valve 105, and transfers the sample 5 into the load lock chamber 102. The surface analysis device 1 closes the gate valve 105 and evacuates the interior of the load lock chamber 102 to a vacuum state of about $1 \times 10^{-3}$ Pa by the vacuum pump system 104. After that, the surface analysis device 1 opens the gate valve 106 and moves the sample 5 onto the stage 6 in the vacuum tank 10. The sample 5 is adsorbed and held on the stage 6. When the surface analysis device 1 closes the gate valve 106, the vacuum tank 10 is evacuated by the vacuum pump system 103 and is maintained to be in a vacuum state of about $1 \times 10^{-4}$ Pa. A series of these operations are automatically performed by the computer system CS1 and the computer system CS2.

The user U1 operates the computer system CS2 or the like to move the stage 6 with the sample 5 mounted thereon to a position directly below the AFM2 so that the analysis target location of the surface of the sample 5 is directly below the probe 7. The user U1 instructs the execution of the surface analysis and a target range on the computer system CS2. According to the instruction, the computer system CS2 controls the AFM2 to scan the surface of the sample 5 using the probe 7 within a specified range of the surface of sample 5, and lowers the probe 7 toward the target location. Accordingly, the tip of the probe 7 and the target location are brought close to each other until interaction with each other is started due to the atomic force. The AFM2 measures the distance between the tip of the probe 7 and the target location based on the interaction at that time and obtains the height information of the surface of the sample 5. The AFM2 similarly scans the surface of the sample 5 using the probe 7 within the specified range to obtain height information.

The AFM2 transmits the signal S2 representing the shape of the surface of the sample 5 to the computer system CS2. The computer system CS2 receives, as an input, and processes the signal S2 from the AFM2, generates an image representing the three-dimensional shape of the surface of the sample 5 as a sample surface image, and displays the image on the screen of the display device.

[Correction Function]

The surface analysis device 1 analyzes the surface of the sample 5 by using the signal S4 from the sensor 4 and the signal S2 of the measurement result of the AFM2. The surface analysis device 1 analyzes the surface shape of the sample 5 in consideration of the state of atmospheric pressure outside the vacuum tank 10. The computer system CS2 corrects the height information in the signal S2 in response to variation in atmospheric pressure indicated by the signal S4. The computer system CS2 calculates the displacement amount of the vacuum tank 10 and the AFM2 (especially, the probe 7) according to the atmospheric pressure variation amount. The computer system CS2 corrects the height information according to the displacement amount so as to exclude the deviation due to the influence of the atmospheric pressure. In other words, the surface analysis device 1 corrects the signal S2 of the AFM2 so as to correct the displacement of the object, such as the probe 7, due to the atmospheric pressure. The computer system CS2 stores and outputs the corrected information.

A specific example of the height correction process is as follows. The computer system CS2 calculates the distance variation amount for a distance D in FIG. 1 according to the atmospheric pressure variation amount based on the signal S4. The distance D is a distance to the upper wall part 10a of the vacuum tank 10 in the Z direction with the upper surface of the stage 6 as a reference position. The computer system CS2 calculates the displacement amount of the AFM2, particularly, regarding the height position of the probe 7 according to the distance variation amount. The computer system CS2 corrects the height information in the signal S2 of the measurement result by using the displacement amount so as to exclude deviation caused by the atmospheric pressure variation.

Effects or Others

As described above, according to the surface analysis device 1 of the first embodiment, even in a case where local deviation occurs in the height information of the measurement result of the AFM2 due to the atmospheric pressure variation in the vacuum tank 10, the accuracy and quality of the measurement and the analysis can be improved. According to the surface analysis device 1 of the first embodiment, highly accurate height information can be obtained by excluding a deviation in the height direction by the correction. According to the surface analysis device 1 of the first embodiment, in the observation image of the sample surface shape obtained by the AFM2, it is possible to acquire a highly-accurate image obtained by excluding the local height deviation amount due to atmospheric pressure variation.

Second Embodiment

A surface analysis device according to a second embodiment of the present disclosure will be described with reference to FIGS. 2 to 9. A basic configuration of the second embodiment is common to that of the first embodiment. In the following, the components of the second embodiment that are different from those of the first embodiment will be mainly described. In the surface analysis device 1 according to the second embodiment illustrated in FIG. 2 and the like, the vacuum tank 10 is provided with an SEM3 as an example of a charged particle beam device and an electron microscope in addition to the AFM2 described above. That is, the surface analysis device 1 of the second embodiment is a device having functions by combining and integrating the AFM2 and the SEM3.

[Surface Analysis Device]

Figure 2:
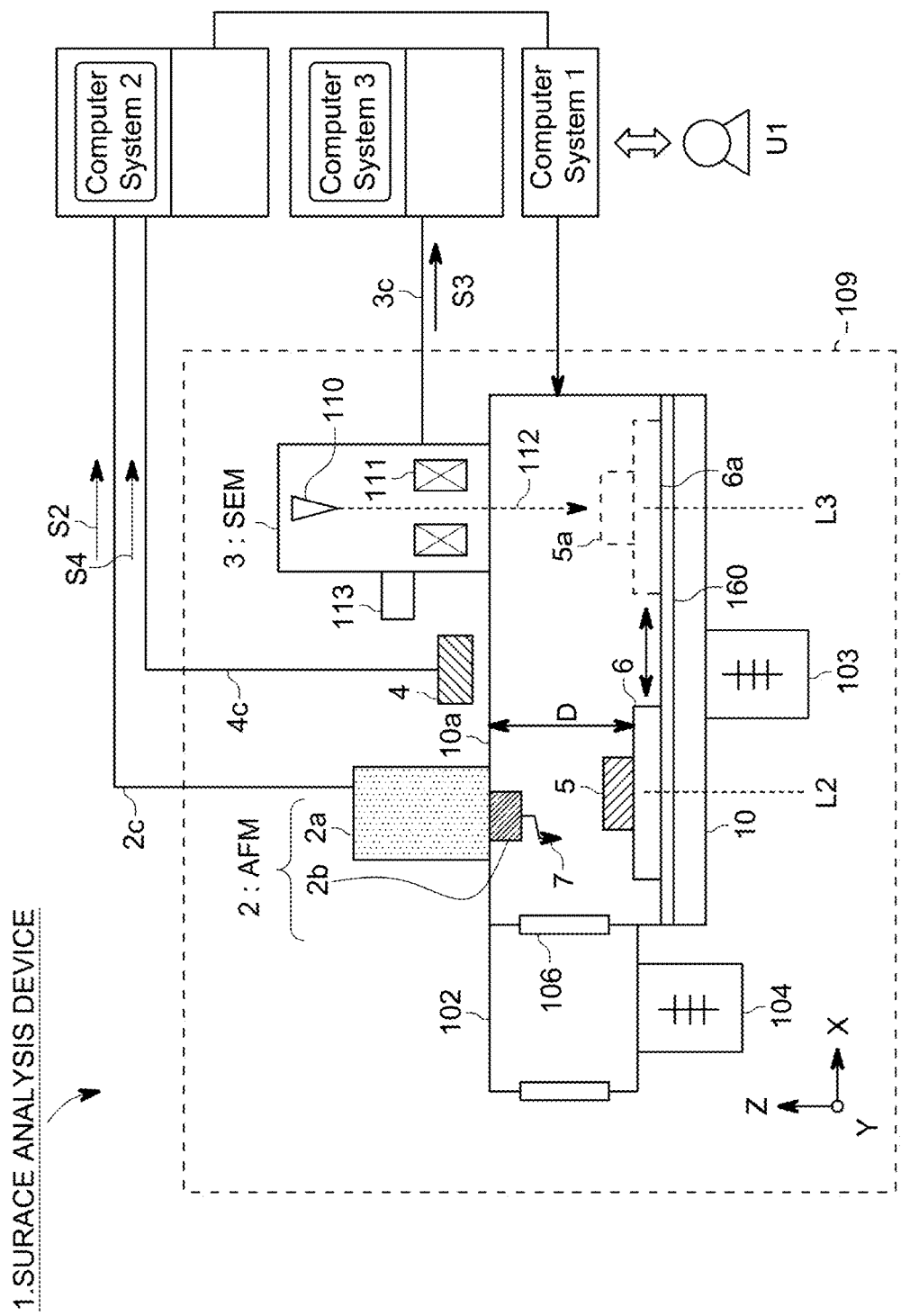
FIG. 2 is a diagram illustrating the overall configuration of a surface analysis device according to a second embodiment of the present disclosure.

FIG. 2 illustrates the overall schematic configuration of the surface analysis device 1 of the second embodiment. The surface analysis device 1 of the second embodiment includes a vacuum tank 10, an AFM2 which is an SPM, an SEM3, a sensor 4, a housing 109, a computer system CS1, a computer system CS2, a computer system CS3, and the like. A user U1 who is an operator uses the surface analysis device 1 by operating the computer system CS2, the computer system CS3, or the like. The sample 5 is, for example, a silicon wafer on which LSIs are formed. The surface analysis device 1 of the second embodiment is configured as an inspection device for an LSI manufacturing factory. The control function of the surface analysis device 1 is configured by connecting and cooperating the three systems of the computer system CS1, the computer system CS2, and the computer system CS3. The computer system CS3 is a system for controlling the SEM3. Components other than the computer systems CS1, CS2, and CS3 in the surface analysis device 1 are accommodated in the housing 109.

The SEM3 is connected to the computer system CS3 through a signal line 3c. The computer system CS3 is interconnected with the computer system CS1 and the computer system CS2. The computer system CS2 controls the AFM2. The computer system CS3 controls the SEM3. The SEM3 outputs a signal S3 of observation results of the sample 5 on the stage 6 to the computer system CS3 through the signal line 3c The computer system CS3 processes the signal S3, for example constructs an image of the observations, and displays the image on a display screen.

In the second embodiment, the computer system CS3 of the SEM3 corresponds to a main control system, and the computer system CS2 of the AFM2 corresponds to a sub control system. In this example, the computer system CS3 controls the computer system CS2 and the computer system CS1. The user U1 mainly operates the computer system CS3. It is noted that the computer system is not limited to such a configuration example. The computer system CS2 of the AFM2 may be the main control system, and the user U1 may mainly operate the computer system CS2. In addition, for example, the computer system CS2 and the computer system CS3 may be integrated into one computer system. A form may be used in which a computer system where main control is performed above the computer system CS2 and the computer system CS3 is further installed. The computer system CS1 may be a computer system that performs higher main control.

In the second embodiment, the AFM2 and the SEM3 are installed at two different positions on the upper wall part 10a of the vacuum tank 10. Schematically, the AFM2 is installed at a position L2, and the SEM3 is installed at a position L3 in the X and Y directions on the upper wall part 10a. The SEM3 is mostly located outside the upper wall 10a above in the Z direction. A bottom portion of the SEM3 penetrates a portion of the upper wall part 10a and communicates with the interior of the vacuum tank 10. The penetrating portion is maintained to be airtight.

The SEM3 includes an electron source 110, an electron optical system 111, and a detector 113. The SEM3 performs irradiation with an electron beam 112 generated by the electron source 110 by the electron optical system 111 so as to converge and scan a target location on the surface of the sample 5. The SEM3 obtains an image of the surface of the sample 5 by detecting secondary electrons or backscattered electrons emitted from the surface of the sample 5 by irradiation with the detector 113. The SEM3 transmits the signal S3 of the obtained image to the computer system CS3 through the signal line 3c.

The stage 6 and the stage moving mechanism 160 are included in the vacuum tank 10. The stage 6 in the second embodiment can be moved in horizontal directions (X and Y directions) by the stage moving mechanism 160. The computer system CS1 drives and controls the stage moving mechanism 160 to move the stage 6 holding the sample 5 to a specified position.

FIG. 2 illustrates the positions L2 and L3 as examples of the position of the stage 6. The position L2 is a position roughly directly below the AFM2 which is used for measurements with the AFM2. A solid line indicates the case where the stage 6 and the sample 5 are located at the position L2. The position L3 is a position roughly directly below the SEM3 used for the observation with the SEM3. A dashed line indicates the case where the stage 6 (6a) and the sample 5 (5a) are placed at the position L3.

Under the control of the computer system CS3, the computer system CS1 moves the stage 6 to the position L3 during the observation of the sample 5 with the SEM3. Under the control of the computer system CS3 and the computer system CS2, the computer system CS1 moves the stage 6 to the position L2 when the sample 5 is measured by the AFM2.

It is noted that the user U1 can also move the stage 6 to a desired position within the range by operating the computer system CS3 or the computer system CS2. Further, the user U1 can perform automatic movement and measurement of the stage 6 by setting the computer system CS3 or the computer system CS2 in advance. The computer system CS3 and the computer system CS2 control the automatic movement of the stage 6 by controlling the computer system CS1 based on functions, settings, and the like.

It is noted that, in the second embodiment, it is a premise that the Z direction position (a reference position to be described later) of the stage 6 in the vacuum tank 10 is defined as a constant position in advance, and the heights at the positions L2 and L3 are the same, and no displacement of the stage 6 in the Z direction due to an external factor (for example, vibration) occurs. Not limited to this, as a modification, the stage moving mechanism 160 may be configured to move the stage 6 in the Z direction. In addition, a configuration in which the displacement of the stage 6 in the Z direction due to an external factor is also considered and corrected may be used. In these cases, the vacuum tank 10 is provided with a mechanism capable of detecting the position and displacement of the stage 6 in the Z direction. The computer system CS2 may use the position of the stage 6 in the Z direction detected by the mechanism as a reference position to similarly perform correction according to the atmospheric pressure.

As a modification of the second embodiment, the sample 5 may be measured and observed by both the AFM2 and the SEM3 at a predetermined position of the stage 6 in the vacuum tank 10.

[Computer System CS2]

Figure 3:
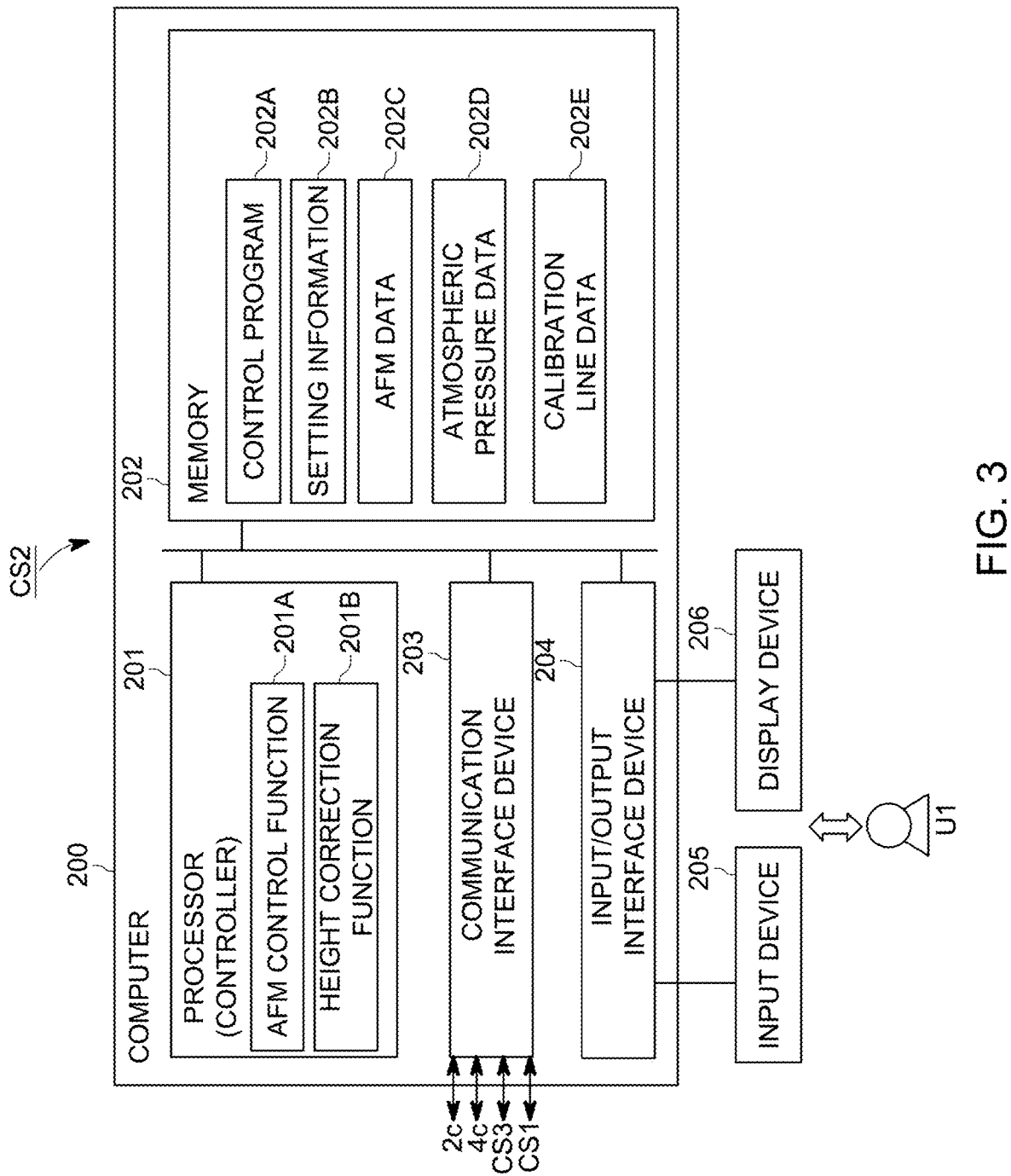
FIG. 3 is a diagram illustrating a configuration example of a computer system for an AFM in the second embodiment.

FIG. 3 illustrates a configuration example of the computer system CS2 for the AFM2. The computer system CS2 is configured with a computer 200, an input device 205, and a display device 206 connected to the computer 200. The computer 200 is configured with a processor 201, a memory 202, a communication interface device 203, an input/output interface device 204, a bus interconnecting the components, and the like. The input device 205, such as a keyboard or a mouse, and the display device 206, such as a liquid crystal display, are connected to the input/output interface device 204. A communication interface device 203 is connected to the signal line 2c of the AFM2 and the signal line 4c of the sensor 4 and performs inputting and outputting of signals to and from the components. In addition, the communication interface device 203 is connected to the computer system CS3 and the computer system CS1 via a predetermined communication interface (for example, wired LAN) and performs communication processing therebetween.

The processor 201 is configured with, for example, a CPU, a ROM, a RAM, and the like and configures a controller of the computer system CS2. The processor 201 implements functions including an AFM control function 201A and a height correction function 201B of the computer system CS2 based on software program processing. The AFM control function 201A is a function of controlling the measurement of the AFM2. The height correction function 201B is a function of correcting the deviation in height information according to the displacement of the AFM2 (specifically, the probe 7) due to the influence of the atmospheric pressure.

The memory 202 is configured with a non-volatile storage device or the like, and stores various data and information used by the processor 201 and the like. The memory 202 stores a control program 202A, setting information 202B, AFM data 202C, atmospheric pressure data 202D, calibration line data 202E, and the like. The control program 202A is a program for implementing each function. The setting information 202B is setting information of the control program 202A and the user U1. The AFM data 202C is data of the signal S2 obtained as a measurement result from the AFM2 and data, such as an image representing the surface shape of the sample 5, obtained as a result of processing based on the signal S2. The atmospheric pressure data 202D is data of the signal S4 obtained from the sensor 4 or data obtained as a result of processing the signal S4. The calibration line data 202E is setting information used for correction by the height correction function 201B.

[AFM-Principle]

Figure 4:
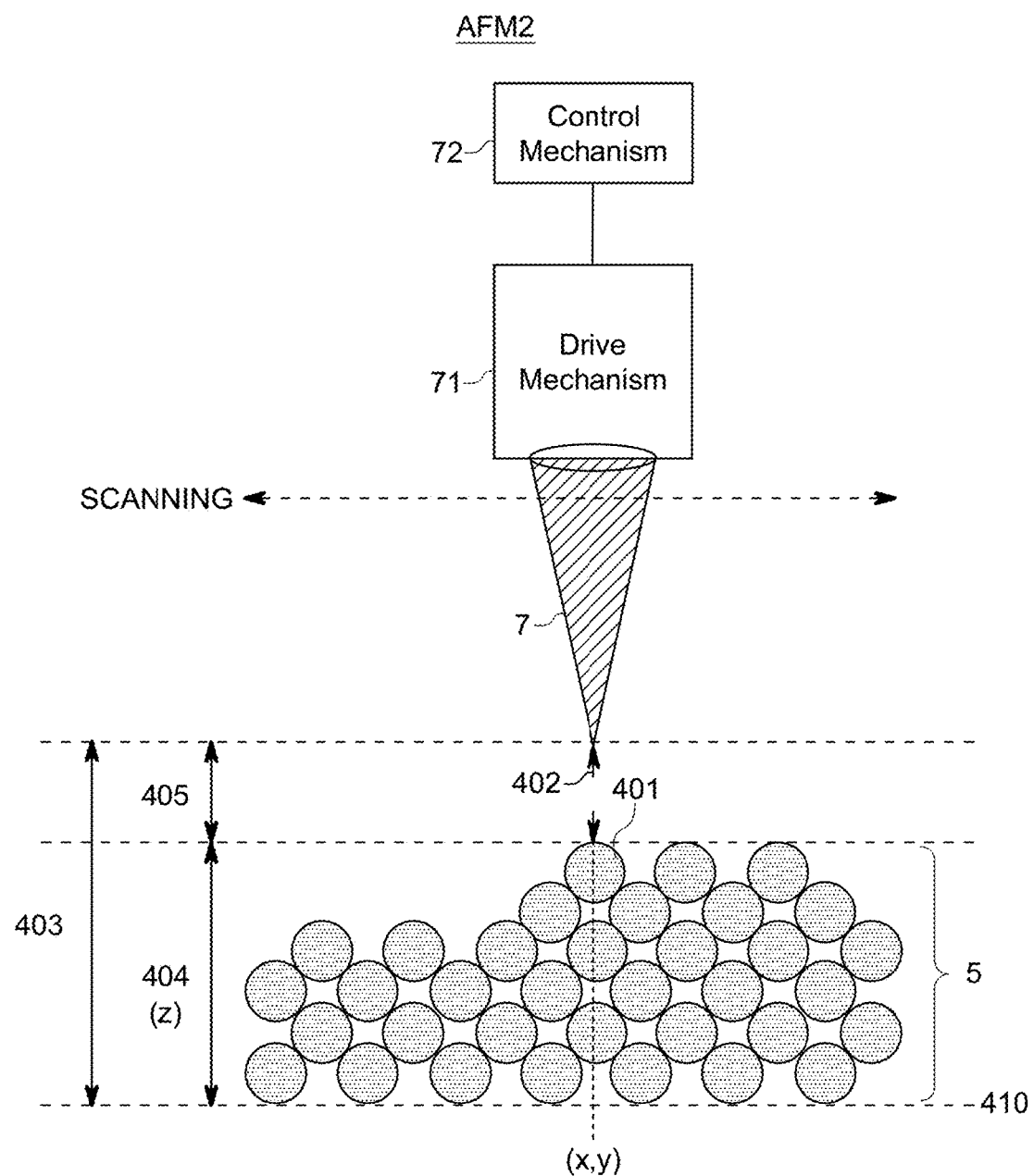
FIG. 4 is a diagram illustrating an overview of an AFM measurement in the second embodiment.

FIG. 4 illustrates a schematic conceptual diagram of the height detection by using the interaction 402 between the probe 7 and atoms 401 on the surface of the sample 5 in the AFM2. A reference position 410 indicates a horizontal plane and position corresponding to the upper surface of the stage 6 and serving as a reference for measurement of the height in the Z direction. For example, a measurement target location is assumed to be the atoms 401 at a certain scanning position. The probe 7 is scanned in the X and Y directions and is at a scanning position (x, y) in FIG. 4. A height 403 is a height from the reference position 410 to the tip of the probe 7 corresponding to the position of the probe 7. A height 404 is a height from the reference position 410 to the atoms 401 corresponding to the height (z) of the measurement target location. A distance 405 is a distance from the atoms 401 at the measurement target location to the tip of the probe 7. The AFM2 measures the distance 405 based on the interaction 402, which is, an atomic force. The AFM2 obtains the height 404 of the atoms 401 at the measurement target location by conversion based on the height 403 (position including height) of the probe 7 and the distance 405. Accordingly, the AFM2 obtains information representing the shape of the surface of the sample 5 including the scanning position (x, y) and the height (z) as the signal S2.

[AFM-Configuration Example]

A configuration example of the AFM2 will be described below. The AFM2 includes the probe 7, a drive mechanism 71, and a control mechanism 72 of FIG. 4. The probe 7 is made of, for example, a silicon material and is processed to have a tip diameter of 10 nm or less. The probe 7 is supported by the drive mechanism 71. The drive mechanism 71 includes, for example, support rods and holders that support the probe 7 and the like. The drive mechanism 71 is a mechanism capable of driving the probe 7 in the X, Y, and Z directions. The drive mechanism 71 is connected to the control mechanism 72. The control mechanism 72 controls the drive mechanism 71 and implements measurement. The drive mechanism 71 and the control mechanism 72 are located in the first portion 2a or the second portion 2b of FIG. 2. The detection of the position including the height 403 of the probe 7 can be implemented by detecting the position including the height of the drive mechanism 71. The drive mechanism 71 or the control mechanism 72 includes a mechanism for detecting the position including the height of the drive mechanism 71. The mechanism includes, for example, a mechanism for irradiating a mirror provided in the drive mechanism 71 with light to detect the position of the reflected light. The control mechanism 72 includes a mechanism for driving and controlling the movement of the probe 7 and a mechanism for detecting the position including the height 403 of the probe 7. Further, the control mechanism 72 includes a mechanism configured to calculate the height 404 of the surface of the sample 5 based on the detection of the distance 405 according to the interaction 402 and to store and output information (signal S2) representing the shape of the surface of the sample 5, or the like. The component of the drive mechanism 71 may be a piezoelectric element or the like, but the present invention is not particularly limited thereto. The piezoelectric element is an element of which length changes in response to the application of a voltage.

During the measurement with the AFM2, the probe 7 is driven to perform scanning in the horizontal direction (X and Y directions) by the drive mechanism 71 and positioned at a target location on the surface of the sample 5 on the stage 6. The probe 7 is located upwards in the Z direction so as to face a target location (for example, atoms 401) on the surface of the sample 5 on the stage 6. The probe 7 is driven by the drive mechanism 71 in the Z direction so as to approach or be in contact with a target location of the surface of the sample 5. The drive is, for example, excitation by a piezoelectric element. At that time, the control mechanism 72 detects the distance 405 based on the atomic force which is the interaction 402 between the tip of the probe 7 and the target location of the sample 5. The control mechanism 72 detects the scanning position (x, y) of the probe 7 in the X and Y directions and the position (height 403) in the Z direction. Then, the control mechanism 72 obtains the height 404 of the target location on the surface of the sample 5 by conversion from the height 403 and the distance 405.

It is noted that the SPM including the AFM requires measurement accuracy on an order of the atomic level (for example, resolution of 0.1 nm). For this reason, high accuracy is required for the position including the height of the probe 7. The surface analysis device 1 of the second embodiment can correct the height information of the measurement result by the correction function even in a case where a deviation according to the atmospheric pressure occurs in the position including the height of the probe 7.

[AFM Measurement Result Image]

Figure 5:
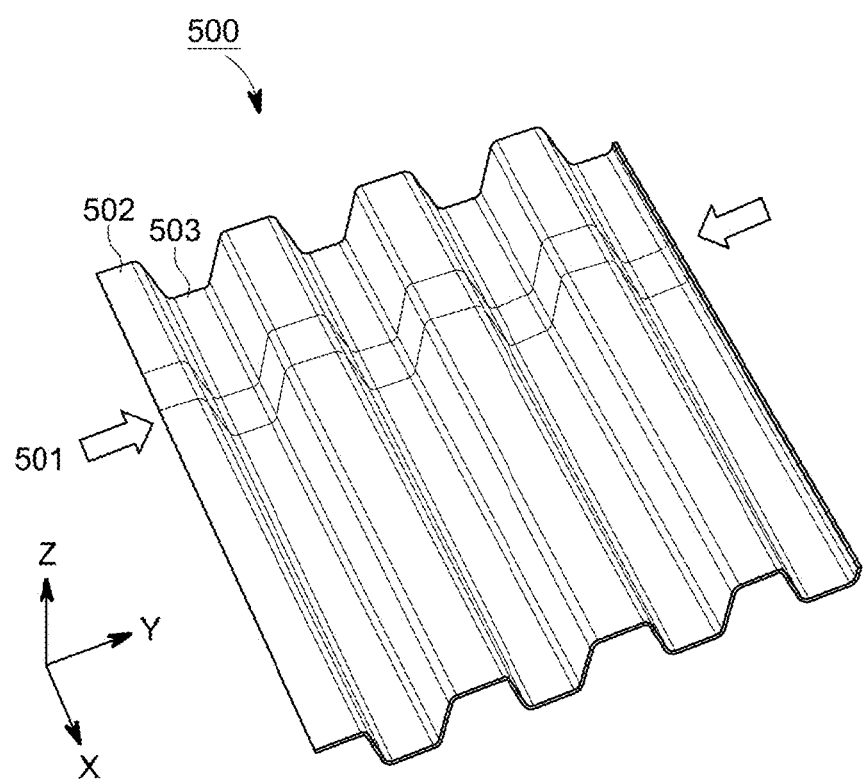
FIG. 5 is a diagram illustrating an example of a height deviation in an image of the AFM measurement result in the second embodiment.

FIG. 5 illustrates an image 500 representing the shape of the surface of the sample 5 in an example of the measurement result of the AFM2. This example illustrates a specific example of a deviation of the height information in the AFM measurement result due to the displacement of the vacuum tank according to the atmospheric pressure variation, which has also been described in the subject. In this example, the surface of the sample 5 has a pattern shape in which a difference in height in the Y direction is repeated like unevenness, as illustrated in the drawings. This pattern shape is a general line-and-space pattern in the LSI. For example, the portion 502 has a first height and the portion 503 has a second height that is smaller than the first height. The AFM2 has a function of displaying the image 500 three-dimensionally in this manner.

In this example, in the image 500 of the AFM measurement result, as indicated by an arrow, in a portion of the pattern shape, as a deviation in the height direction (in other words, a height variation amount), a bump, a band-like portion 501, in other words, a portion like deformation of the image occurs. This deviation portion 501 is caused by minute variation (for example, a decrease of about 10 Pa) in the atmospheric pressure in the clean room during a short period of time (for example, from several seconds to several tens of seconds) when this portion 501 is scanned with the probe 7. In examples confirmed by the present inventors, typically, there were cases where minute atmospheric pressure variation of about 10 Pa occurred during a short period of time from several seconds to several tens of seconds.

Due to this atmospheric pressure variation, for example, due to a decrease of about 10 Pa, the vacuum tank 10 expands slightly, and thus, the wall surface is displaced in the Z direction, particularly the upper wall part 10a is displaced upwards in the Z direction. Accordingly, the distance between the upper surface of the stage 6 and the upper wall part 10a increases slightly. As a result, the distance from the target location on the surface of the sample 5 as viewed from the probe 7 slightly increases and appears as a deviation in height. This deviation in height reaches about 40 nm in this example. Needless to say, the deformation/displacement like this portion 501 is not an original shape of the surface of the sample 5, and thus, it is desirable that the deformation/displacement is not observed. The surface analysis device 1 corrects such a deviation in height as a correction target.

[Processing Flow]

Figure 6:
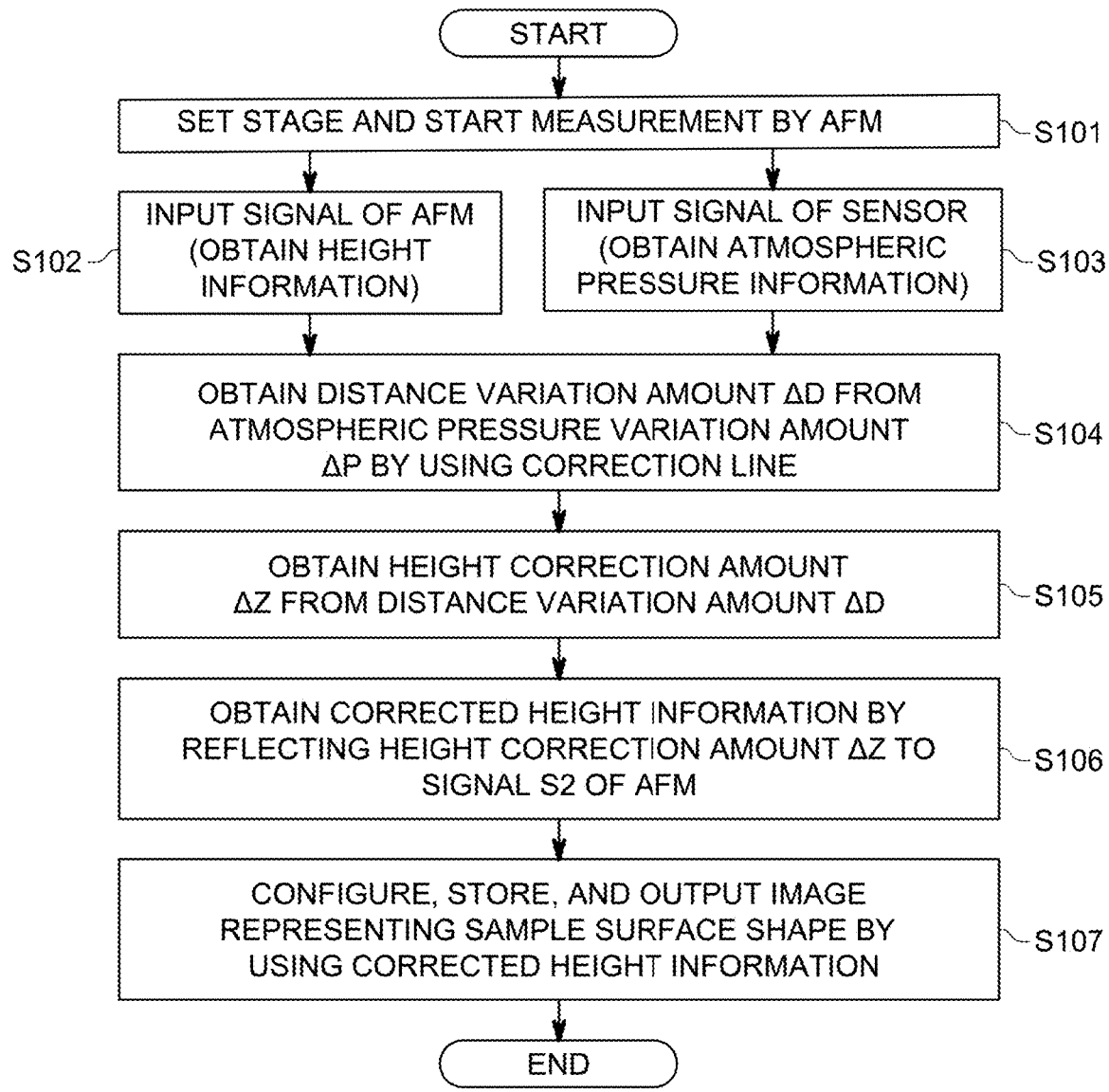
FIG. 6 is a diagram illustrating a main processing flow in the second embodiment.

FIG. 6 illustrates a main processing flow of the surface analysis device 1, especially the computer system CS2. The flow of FIG. 6 has steps S101 to S107. In step S101, the computer system CS2 starts the measurement by the AFM2 based on the operation of the user U1. At this time, the computer system CS2 controls the computer system CS1 so that the stage 6 having the target sample 5 mounted thereon is positioned at the position L2 directly below the AFM2.

In step S102, the computer system CS2 drives and controls the AFM2 to perform the measurement of the sample 5. The AFM2 sequentially scans the surface of the sample 5 with the probe 7, obtains information on the scanning position (x, y) and height (z) at each time point (t), and uses the information as the signal S2. The computer system CS2 receives, as an input, the signal S2 from the AFM2.

On the other hand, in step S103, at the same time as step S102-S2, the computer system CS2 receives, as an input, the signal S4 from the sensor 4 and acquires a measurement value of the atmospheric pressure.

In step S104, the computer system CS2 first calculates an atmospheric pressure variation amount $\Delta P$ based on the signal S4 out of the two types of signals S2 and S4. When there is atmospheric pressure variation, the computer system CS2 uses a preset calibration line (calibration line data 202E in FIG. 3) to obtain a distance variation amount $\Delta D$ corresponding to the atmospheric pressure variation amount $\Delta P$. The distance variation amount $\Delta D$ is a variation amount related to the distance D (FIG. 2) between the reference position, which is the upper surface of the stage 6, and the upper wall part 10a of the vacuum tank 10. The upper wall part 10a is a location where the displacement according to the atmospheric pressure occurs.

In step S105, the computer system CS2 obtains a height correction amount ΔZ by conversion from the distance variation amount ΔD. The height correction amount ΔZ is a correction amount so as to be reflected in the height information (the height 404 in FIG. 4) of the measurement result. Since the distance D and the height 403 (FIG. 4) of the probe 7 have a predetermined relationship, such conversion is possible. It is noted that the relationship between the distance variation amount ΔD and the height correction amount ΔZ may be set in advance in the configuration of the calibration line data 202E. That is, the height correction amount ΔZ may be obtained from the atmospheric pressure variation amount ΔP on the calibration line.

In step S106, the computer system CS2 obtains the corrected height information by performing a correction operation that reflects the height correction amount ΔZ to the height information (for example, the height 404 in FIG. 4) obtained from the signal S2 from the AFM2, for example, addition.

In step S107, the computer system CS2 constructs, stores, and outputs an image representing the surface shape of the sample by using the corrected height information. In other words, the computer system CS2 corrects the pre-correction image as illustrated in FIG. 5 by using the corrected height information to obtain the corrected image. The computer system CS2 displays the corrected image on the screen of the display device 206 (FIG. 3).

[Height Variation (1)]

Figure 7A:
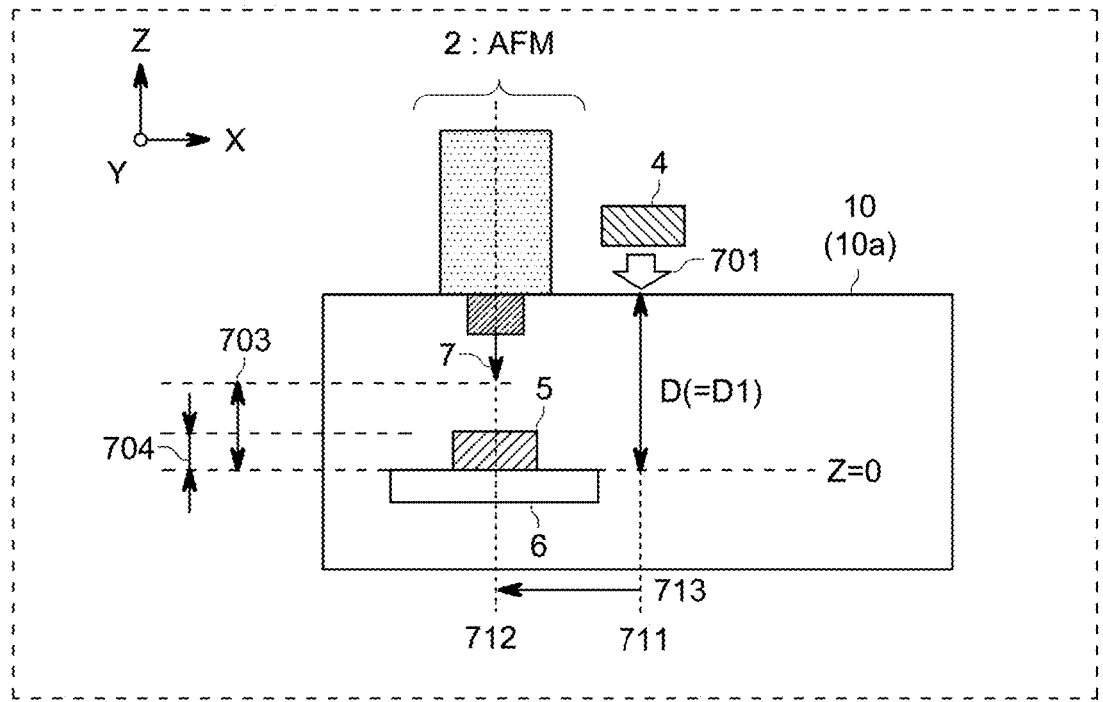
FIGS. 7A and 7B are diagrams illustrating an example of a distance variation according to an atmospheric pressure variation in the second embodiment.
Figure 7B:
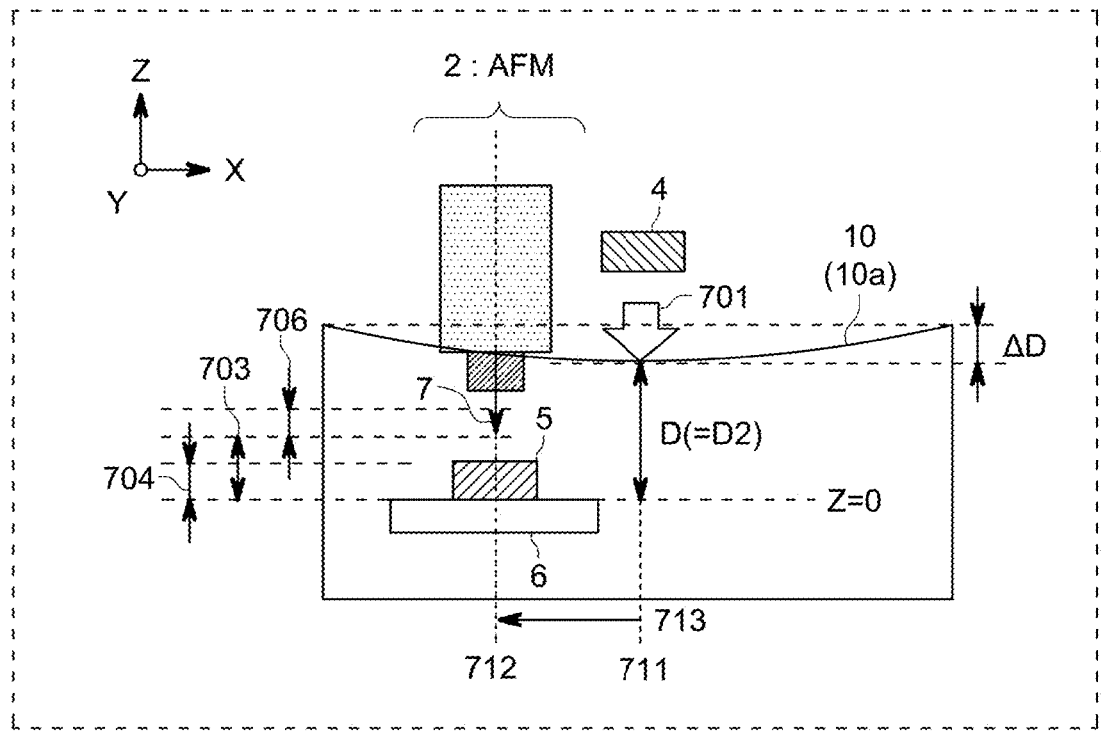

FIGS. 7A and 7B are explanatory diagrams illustrating the height variation due to the influence of the atmospheric pressure. In the vacuum tank 10 having the AFM2, the AFM2 is fixed to the upper wall part 10a. An atmospheric pressure 701 is applied to the upper surface of the upper wall part 10a. For example, when the atmospheric pressure is 1010 hPa, a force of about 10.1 N/cm$^2$ is applied to the wall surface. FIG. 7A is a case where the atmospheric pressure 701 is a standard predetermined atmospheric pressure. A predetermined atmospheric pressure is normally applied as the atmospheric pressure 701 to the wall surfaces, such as the upper wall part 10a, of the vacuum tank 10 of which the interior is in a vacuum state. The surface analysis device 1 uses a reference atmospheric pressure (PS), which is a preset standard atmospheric pressure. It is assumed that the reference atmospheric pressure PS is, for example, 1 atmospheric pressure=1035.25 hPa (=103525 Pa). The distance D is a distance between the reference position (Z=0) of the upper surface of the stage 6 and the position (for example, the lower surface) of the upper wall part 10a in the Z direction which is the height direction. It is assumed that the distance D in 7A (A) is a standard distance D1 corresponding to the reference atmospheric pressure PS.

Herein, the distance D is taken at a center position 711 of the upper wall part 10a in the X and Y directions. In addition, the AFM2 is provided with a reference position in the X and Y directions at a position 712 having a predetermined distance 713 from the center position 711 in the X and Y directions.

The surface analysis device 1 handles the atmospheric pressure variation amount (denoted as ΔP) with respect to the atmospheric pressure. The atmospheric pressure variation amount ΔP is a variation amount with respect to the reference atmospheric pressure PS, in other words, a difference between time points.

FIG. 7B illustrates exaggeratedly a case where the atmospheric pressure 701 temporarily increases from the state of FIG. 7A, and the upper wall part 10a is pushed downwards inside the vacuum tank 10, that is, in the Z direction. When the atmospheric pressure varies during the scanning with the probe 7, the displacement amount and distortion amount of the wall surface of the vacuum tank 10 change. In this example, the upper wall part 10a is distorted so as to bend downwards in the Z direction, as illustrated. Accordingly, the distance D changes so as to decrease to a distance D2 (D2<D1). The distance variation amount ΔD is (D2−D1). A typical variation amount of the distance D is about several nm/Pa.

The AFM2 is also displaced downwards in the Z direction along with the variation in the distance D, such as the bending of the upper wall part 10a. Accordingly, a height position 703 regarding the probe 7 is also changed to, for example, a lower height position. A displacement amount 706 is a difference in change in the height position 703 of the probe 7.

With the variation of the distance D, a deviation occurs in the height information of the measurement result of the AFM2. In this example, since the atmospheric pressure slightly increases, the force applied to the upper surface of the upper wall part 10a of the vacuum tank 10 becomes larger, and the upper surface is pushed downwards in the vacuum tank 10, that is, in the Z direction. As a result, the distance D decreases, and accordingly, the probe 7 also moves closer to the stage 6. Accordingly, the surface of the sample 5 viewed from the probe 7 as measured by the AFM2 appears lower. Therefore, in the image of the measurement result, a portion of deviation such that the height is lowered occurs. Similarly, when the atmospheric pressure decreases, the distance D increases, and the surface of the sample 5 viewed as measured by the AFM2 appears higher. Therefore, in the image of the measurement result, as in the example illustrated in FIG. 5, a portion of deviation that makes the height higher occurs.

The distance D at the center position 711 in the horizontal plane and the height position 703 of the probe 7 at the position 712 of the AFM2 have a predetermined correspondence relationship. Based on experiments, geometric calculations, or the like, data on the correspondence relationship between the atmospheric pressure, the distance D, and the height position 703 can be obtained in advance. The calibration line (calibration line data 202E in FIG. 3) such as the example in FIG. 8 can be set based on this. During the correction of the height, the surface analysis device 1 obtains the distance variation amount ΔD from the atmospheric pressure variation amount ΔP based on the calibration line reflecting such a relationship, obtains the displacement amount 706 of the height position 703 of the probe 7 from the distance variation amount ΔD, and reflects as the height correction amount ΔZ. The example of FIG. 7B is the case of contraction of the vacuum tank 10 due to an increase in the atmospheric pressure, but even in the case of expansion of the vacuum tank 10 due to a decrease in the atmospheric pressure, the correction can be performed similarly.

[Height Variation (2)]

Herein, the correction calculation may be simplified by regarding the position 712 in the X and Y directions of the AFM2 as roughly the same as the center position 711. That is, the distance variation amount ΔD may be directly used as the height correction amount ΔZ. The calibration line in this case defines the relationship between the atmospheric pressure variation amount ΔP and the height correction amount ΔZ. The position 712 of the AFM2 in the vacuum tank 10 in the X and Y directions is not limited.

In the case of performing more highly-accurate correction, the position 712 of the AFM2 in the X and Y directions is also considered. That is, as described above, the height correction amount ΔZ corresponding to the height position 703 of the probe 7 can be determined by using the calibration line in which the relationship between the distance D at the center position 711 and the height position 703 of the probe 7 at the position 712 of the AFM2 is set.

Furthermore, as a modification, as a more detailed method, a method of performing correction in consideration of the variation in the position and direction in the X and Y directions of the probe 7 of the AFM2 due to the bending and distortion of the upper wall part 10a may be used. As illustrated in FIG. 7B, for example, when the upper wall part 10a bends, the position and direction of the probe 7 of the AFM2 in the X and Y directions may change slightly. By setting the relationship among the distance D, the displacement of the probe 7 in the X and Y directions, and the height position 703 on the calibration line in advance, the correction in the X and Y directions in addition to the Z direction can be performed.

The portion where the AFM2 is fixed to the vacuum tank 10 is not limited to the upper wall part 10a. Even in the case of a form in which the AFM2 is fixed to a portion other than the upper wall part 10a, the displacement amount of the position of the probe 7 of the AFM2 according to the atmospheric pressure variation amount ΔP can be defined in the same manner, and the correction regarding the measurement value of the AFM2 is possible.

[Calibration Line]

Figure 8:
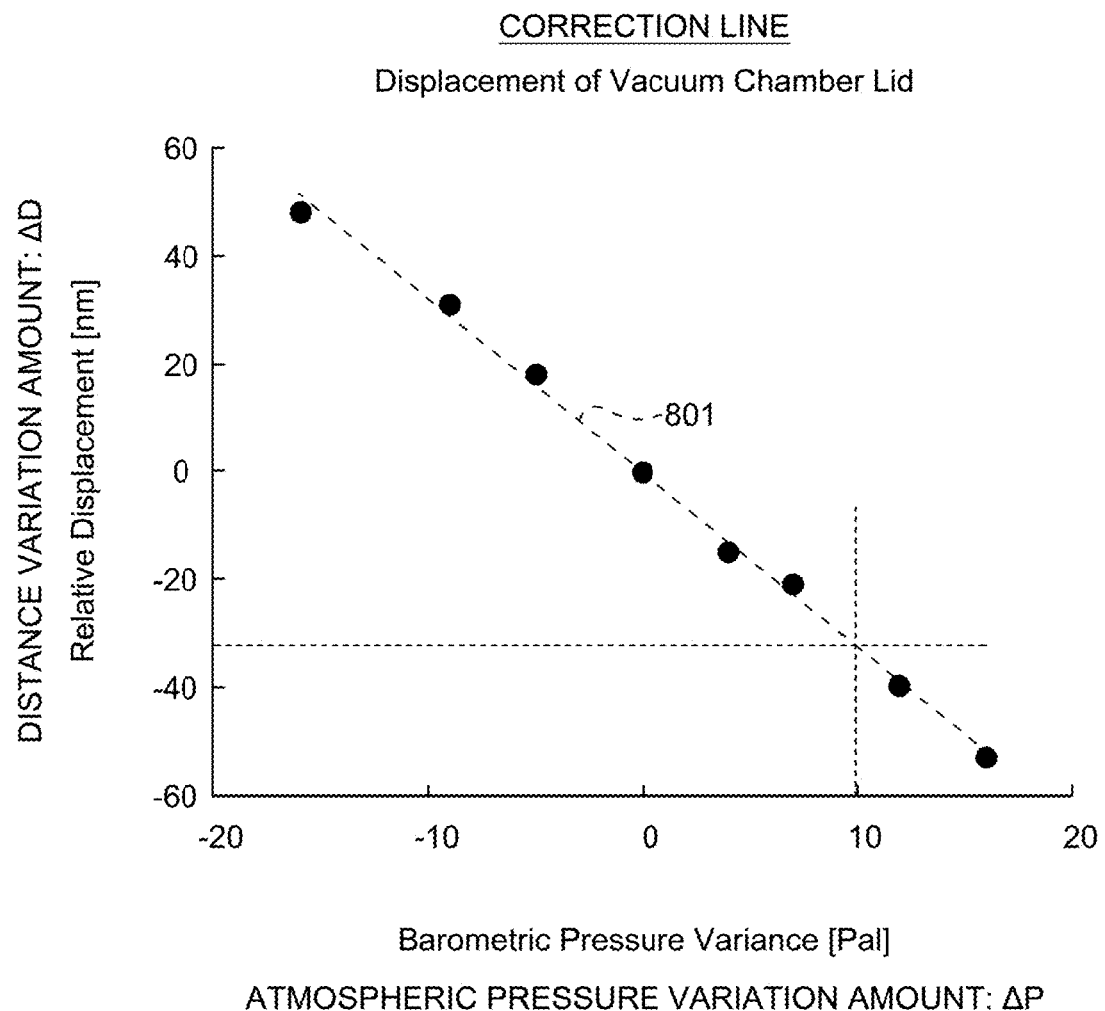
FIG. 8 is a diagram illustrating an example of a calibration line in the second embodiment.
Figure 9:
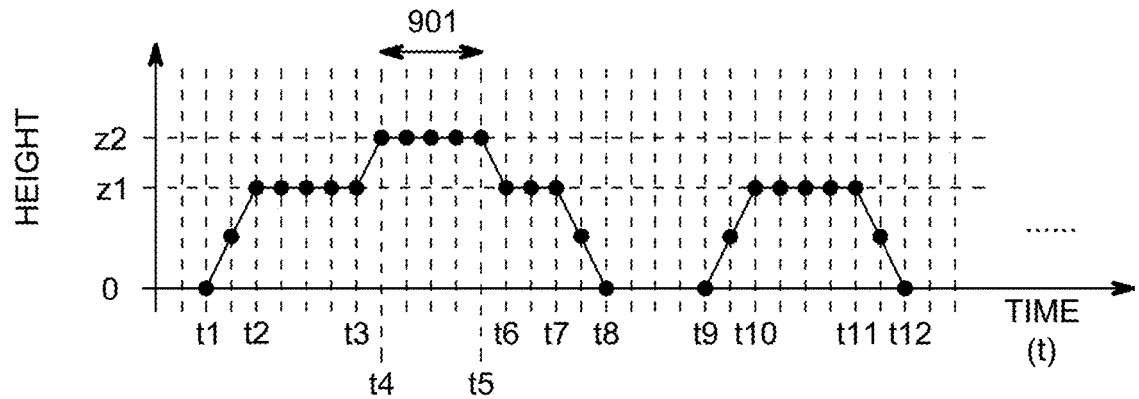
FIGS. 9A to 9D are diagrams illustrating a relationship between various signals in the second embodiment.
Figure 9:
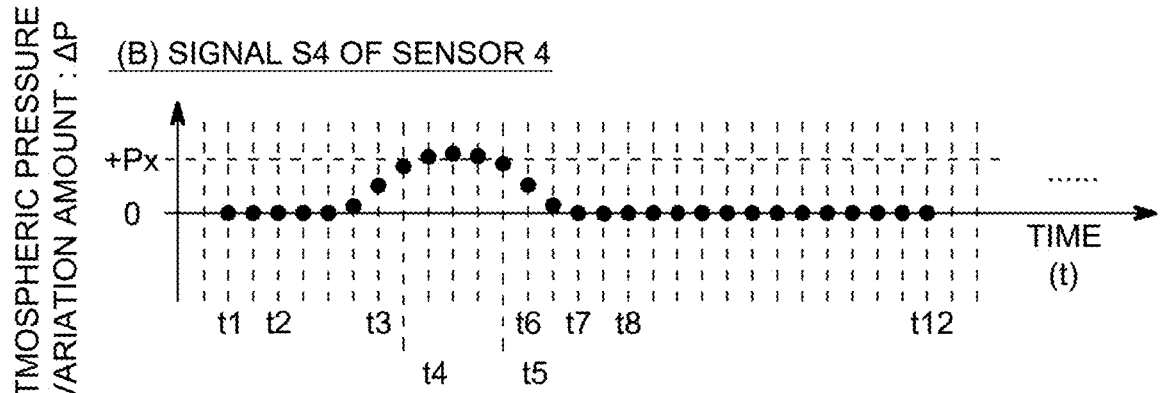
Figure 9:
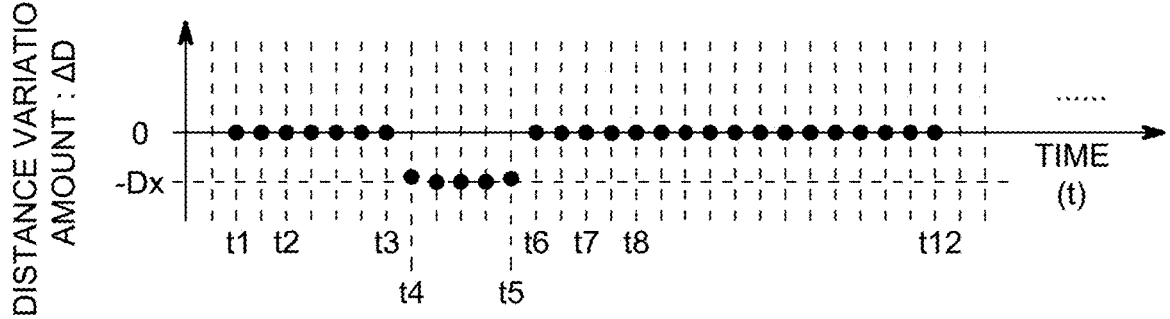
Figure 9:
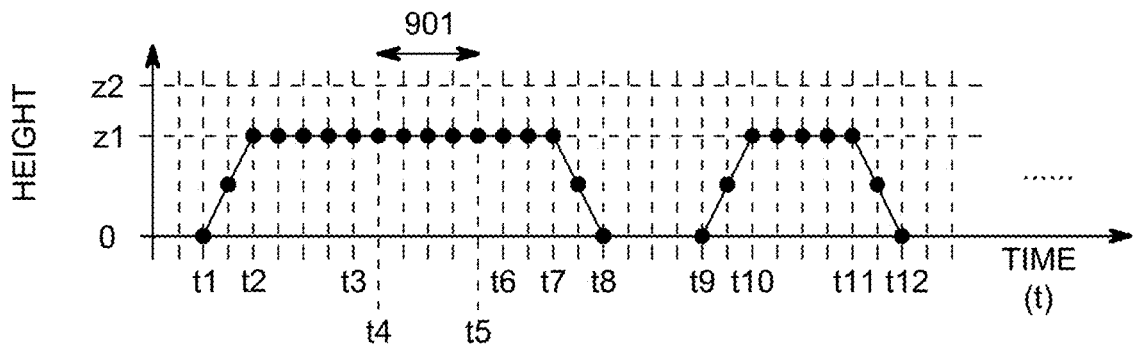

FIG. 8 illustrates an example of a calibration line (calibration line data 202E in FIG. 3) which is setting information for the correction. This calibration line is a calibration diagram for use in correcting the displacement of the wall surface of the vacuum tank 10 according to atmospheric pressure variation. The horizontal axis of the graph in FIG. 8 is the atmospheric pressure variation amount ΔP [Pa] (barometric pressure variance), which is a difference from a standard predetermined atmospheric pressure (reference atmospheric pressure PS), and has a positive or negative value centered on 0. The vertical axis is the distance variation amount ΔD [nm] (Relative Displacement) regarding the distance D in FIGS. 2 and 7. A line 801 is a calibration line that defines the relationship between the atmospheric pressure variation amount ΔP and the distance variation amount ΔD. The black dots are experimentally measured values. For example, when the atmospheric pressure variation amount ΔP is +10 Pa, the distance variation amount ΔD is about −33 nm. The height correction amount ΔZ is obtained by conversion as a value close to −33 nm.

The surface analysis device 1 can set a calibration line that has been generated in advance based on experiments or the like. It is noted that the surface analysis device 1 is not limited to the configuration of such a calibration line, and may perform correction by using a conversion formula, a conversion table, or the like. The computer system CS2 also allows a user to set the calibration line. The computer system CS2 displays the calibration line as in FIG. 8 on the screen of the display device 206 and accepts user settings.

[Various Signals]

FIGS. 9A-9D illustrate an example of a time-series correspondence relationship between various signals and the like. The horizontal axis of FIGS. 9A-D is time (represented by a time point t). FIG. 9A is an example of data of the signal S2, that is, height information from the AFM2 before the correction. The vertical axis corresponds to the height of the surface of the sample 5 (the height 404 in FIG. 4 and a height 704 in FIGS. 7A-B, and the unit is, for example, nm. Time points t1 to t12 are illustrated as examples of time points on the horizontal axis. For example, each of the time points t1 to t12 corresponds to a scanning position in the X direction. It is noted that, for example, the time point t in the signal S4 is used as a reference for time in each process. The height information of FIG. 9A represents the shape of the surface of the sample 5, such as unevenness. In this example, the shape is O at the time point t1 and height z1 at the time points t2 to t3. The shape is a height z2 (z2>z1) at the time points t4 to t5. The shape is the height z1 at the time points t6 to t7, is 0 at the time points t8 to t9, is the height z1 at the time points t10 to t11, and is 0 at the time point t12. A portion of the height z2 at a time 901 between the time points t4 and t5 is an example of the deviation due to the atmospheric pressure variation, which is different from the actual shape.

FIG. 9B illustrates the atmospheric pressure measurement value by the signal S4 of the sensor 4, especially the atmospheric pressure variation amount ΔP. The vertical axis is the atmospheric pressure variation amount ΔP with the reference atmospheric pressure PS at 0 position. At the time 901, the atmospheric pressure temporarily increases to approximately +Px. The surface analysis device 1 measures the atmospheric pressure by the sensor 4 at the time of measurement by the AFM2 (in other words, during the image acquisition). The computer system CS2 of the surface analysis device 1 synchronizes and acquires the height information of the signal S2 of the AFM2 with the atmospheric pressure measurement value of the signal S4. The synchronization denotes that the time points of pieces of information correspond to each other in time series.

FIG. 9C illustrates the distance variation amount ΔD calculated from the atmospheric pressure variation amount ΔP in FIG. 9B by using the calibration line. Herein, for simplicity, it is assumed that the distance variation amount ΔD and the height correction amount ΔZ are the same. The vertical axis represents the distance variation amount ΔD, where 0 is set when the upper wall part 10a of the vacuum tank 10 is at the standard position FIG. 7A. At the time 901, the height position of the probe 7 of the AFM2 is temporarily lowered with the upper wall part 10a being pushed downwards due to the influence of an increase in atmospheric pressure in FIG. 7B, and the distance variation amount ΔD is approximately typically −Dx.

FIG. 9D illustrates an example of the corrected signal S2 of the AFM2 using the distance correction amount ΔZ corresponding to the distance variation amount ΔD of FIG. 9C, that is, corrected height information. At the time 901, the height value of the original signal S2 reflects the negative distance correction amount ΔZ corresponding to −Dx in FIG. 9C. Accordingly, the corrected height information is approximately the height z1 at the time 901. In this manner, the deviation portion in the height at the time 901 in FIG. 9A is corrected as in FIG. 9D.

Each of the information FIG. 9A to FIG. 9D is information that has a corresponding relationship at a time point t with reference to a time point t of the signal S2 of FIG. 9A. The computer system CS2 corrects the height information by using the signal S4 from the sensor 4 with the time point t based on the input of the signal S2 from the AFM2 as a reference. It is noted that the surface analysis device 1 may display each graph as illustrated in FIGS. 9A-D on the screen of the display device 206 (FIG. 3) of the computer system CS2. The user U1 can confirm those pieces of information.

[Configuration of Combination of AFM and SEM]

As in the second embodiment, the surface analysis device 1 configured by combining the AFM2 which is an SPM and the SEM3 has, for example, the following advantages and the corresponding functions.

(A) In this surface analysis device 1, the same sample 5 can be observed and measured by both the SEM3 and the AFM2 without movement thereof between the devices. As a comparative example, when the SEM and the AFM are provided as two separate devices, a user needs to move the sample between these devices. For example, after observing the target sample in the SEM device, the user needs to take a trouble of moving the sample into the AFM device and then performing measurement with the AFM device. On the other hand, in the surface analysis device 1 of the second embodiment, after the sample 5 is mounted on the stage 6 in the vacuum tank 10, the desired observation and measurement can be used for each of the SEM3 and the AFM2 only by only controlling the movement of the stage 6.

(B) In this surface analysis device 1, when moving the sample 5 on the stage 6 to the observation portion (position L2 in the figure) of the AFM2 for measurement with the AFM2, highly-accurate positioning by observation with the SEM3 can be used. For this reason, when starting the measurement with the AFM2, the user U1 can reach a desired location on the sample 5 at a high speed, and the measurement with the AFM2 can be achieved at a high accuracy. In the observation of the SEM3, highly-accurate stage movement calibrated with a high-magnification SEM3 can be utilized.

Details regarding (B) are below. When the sample 5 is mounted on the stage 6 in the vacuum tank 10 by a carry mechanism from the load lock chamber 102 side of FIG. 2, the sample 5 is adsorbed and held at a predetermined position on the stage 6 in a predetermined direction in accordance with, for example, marks or the like on the stage 6. In some cases, after this installation, a positional deviation in the X and Y directions may occur. The surface analysis device 1 moves the stage 6 holding the sample 5 to the position L3 directly below the SEM3 before the measurement with the AFM2. The surface analysis device 1 checks whether a position of a sample 5a on a stage 6a is correct by observing the sample 5a, the marks, or the like on the stage 6a at the position L3 by using the SEM3 (especially the microscope function thereof). As a result, when there is a deviation, the surface analysis device 1 corrects the positional deviation of the sample 5 on the stage 6 by driving the mechanism with the computer system CS1. Accordingly, the position of the sample 5 on the stage 6 can be positioned with high accuracy. After that, the surface analysis device 1 controls the stage moving mechanism 160 to move the stage 6 to the position L2 directly below the AFM2. Then, the surface analysis device 1 performs the measurement with the AFM2 at the position L2. Accordingly, highly accurate surface analysis of the sample 5 is possible.

The function of combining the AFM2 and the SEM3 is an example, and various other functions related to surface analysis can be provided.

[Supplement (1)]

It is noted that, in the second embodiment, two devices of the SEM3 and the AFM2 are fixed on the upper wall part 10a of the vacuum tank 10. Regarding the influence of the atmospheric pressure, the AFM2 can be dealt with by the correction function as described above, but the SEM3 does not have to be considered. The reason for this is as follows. The SEM3 in FIG. 2 is a device that uses, for example, an electrostatic lens or an electromagnetic lens as the electron optical system 111 to converge, in other words, focus the electron beam 112 on the surface of the sample 5. In the case of the electron beam 112, the so-called depth of focus is relatively deep, and in the SEM3 of the second embodiment, the depth of focus is on the order of μm. For this reason, even if the SEM3 is displaced by, for example, several tens of nanometers due to the influence of the atmospheric pressure, there is almost no influence in terms of the measurement accuracy. On the other hand, in the case of the AFM2, the probe 7 is a device capable of allowing a real object to be in contact with the surface of the sample 5, and an accuracy of the order of nm is required, and there is no concept of depth of focus. For this reason, when the AFM2 is displaced by, for example, several tens of nanometers due to the influence of the atmospheric pressure, the measurement accuracy is significantly influenced. Therefore, in the second embodiment, the AFM2 is provided with the correction function.

[Supplement (2)]

In the first and second embodiments, the AFM2 is fixed to the upper wall part 10a of the vacuum tank 10. The position and manner in which the AFM2 is fixed are not limited to this. Even in the case where the AFM is fixed to a side wall part or a bottom wall part of the vacuum tank 10, the same may be displaced in a predetermined direction (not limited to the Z direction) according to atmospheric pressure variation. Even in this case, a mechanism can be similarly provided to compensate for displacement in that direction. Further, for example, in the structure of the vacuum tank 10, when there is a portion continuously protruding from the main wall surface, even if the AFM2 is fixed to that portion, the displacement of the wall surface influences the AFM2 through that portion. Therefore, even in a case of such a structure, the correction function can be similarly applied.

Effects, or the Like

As described above, according to the surface analysis device 1 of the second embodiment, as an effect similar to that of the first embodiment, even in a case where a local deviation occurs in the height information of the measurement result of the AFM2, the accuracy and quality of the measurement and the analysis can be improved. According to the surface analysis device 1 of the second embodiment, highly accurate surface analysis can be realized by using a combined function of the AFM2 and the SEM3.

Third Embodiment

A third embodiment is a modification of the first embodiment and can be applied to the second embodiment similarly. The aforementioned height correction may be realized by program processing or may be realized by a dedicated circuit. The third embodiment illustrates an implementation example in which height correction processing is performed in real time by using a dedicated circuit.

Figure 10:
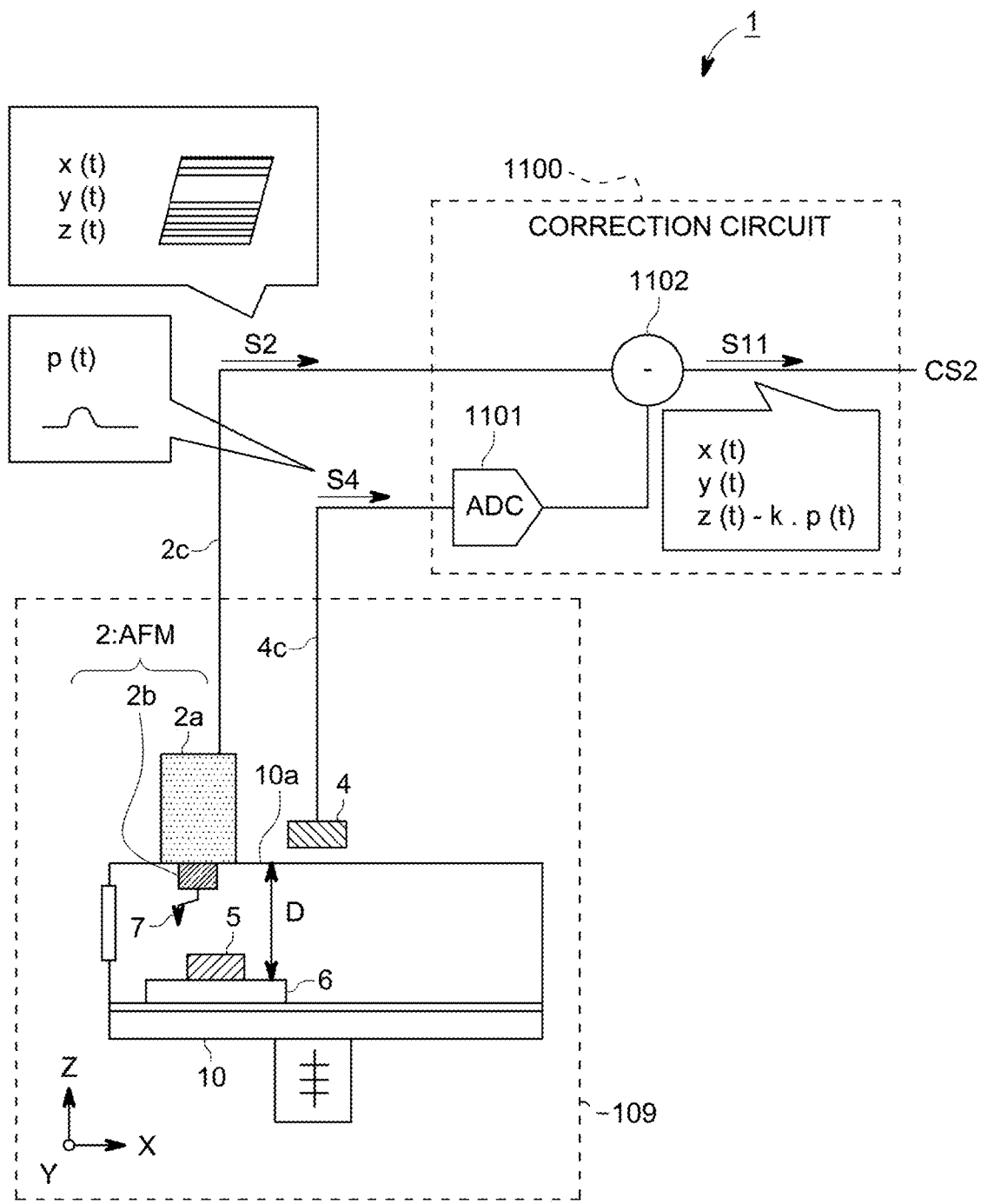
FIG. 10 is a diagram illustrating a configuration of a surface analysis device according to a third embodiment of the present disclosure.

FIG. 10 illustrates a configuration of main components in a surface analysis device 1 of the third embodiment. The surface analysis device 1 of the third embodiment includes a correction circuit 1100 between an AFM2 and a sensor 4 and a computer system CS2. The correction circuit 1100 may be implemented by using a dedicated hardware circuit, such as an FPGA or an ASIC.

The correction circuit 1100 includes an analog/digital conversion circuit (ADC) 1101 and a correction calculation circuit 1102. The ADC 1101 inputs the signal S4 from the signal line 4c of the sensor 4, AD-converts the signal S4, and outputs a digital signal relating to an atmospheric pressure measurement value. The correction calculation circuit 1102 receives, as an input, the signal S2 from the signal line 2c of the AFM2 and uses the digital signal from the ADC 1101 to perform a predetermined height correction calculation. For example, as indicated by balloons, the signal S2 includes information (x(t), y(t)) regarding a scanning position in the X and Y directions as information at each time point (t) and height information z(t) at that position. The signal S4 includes the atmospheric pressure measurement value p(t) at each time point t. Correction operation of the correction operation circuit 1101 is expressed as "z(t)−k·p(t)". This correction calculation is an operation of subtracting a product of the atmospheric pressure measurement value p(t) and the correction coefficient k obtained based on a calibration line from the height information z(t) in, for example, the signal S2. A signal S11 output from the correction calculation circuit 1101 is input to the computer system CS2 and processed.

It is noted that such the correction circuit 1100 may be located in the housing 109 near the AFM2 and the sensor 4, or may be located outside the housing 109 near the computer system CS2. The correction circuit 1100 may be provided integrally within the computer system CS2. The correction circuit 1100 may be integrated into the sensor 4.

As described above, according to the third embodiment, the height information can be corrected in real time and at a high speed by the correction circuit 1100 following the measurement by the AFM2. Accordingly, the program processing in the computer system CS2 can be reduced.

Fourth Embodiment

A fourth embodiment is a modification of the first embodiment and can be applied to the second embodiment similarly. The fourth embodiment illustrates an implementation example in which height correction processing can be realized not in real time but as post-processing collective processing.

Figure 11:
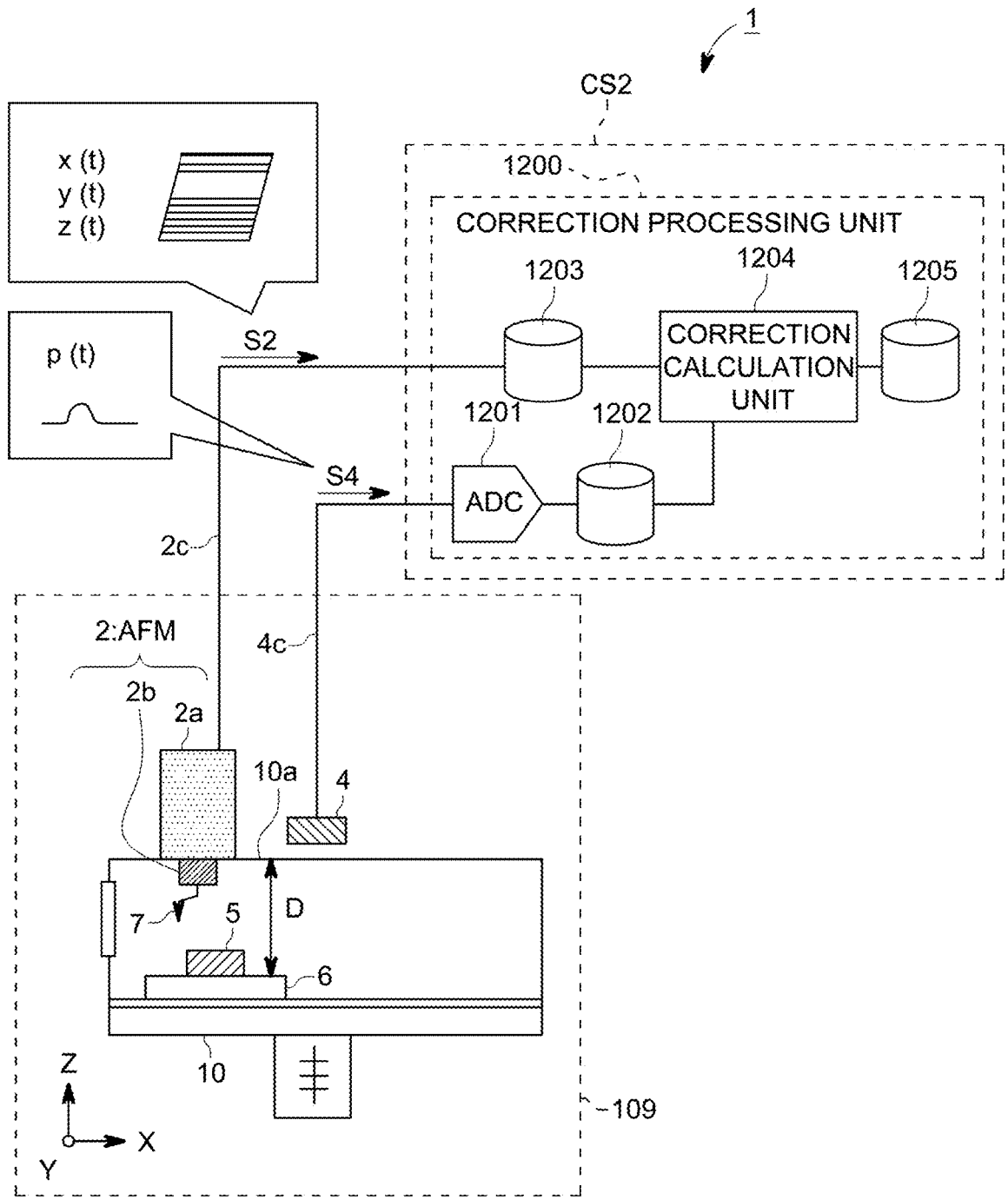
FIG. 11 is a diagram illustrating a configuration of a surface analysis device according to a fourth embodiment of the present disclosure.

FIG. 11 illustrates a configuration of main components of a surface analysis device 1 of the fourth embodiment. In the fourth embodiment, the computer system CS2 has a correction processing unit 1200. The correction processing unit 1200 may include a dedicated circuit such as an ADC 1201 in part. The correction processing unit 1200 has an ADC 1201, an atmospheric pressure data storage unit 1202, an AFM data storage unit 1203, a correction calculation unit 1204, and a correction result storage unit 1205.

The ADC 1201 converts the signal S4 from the sensor 4 into a digital signal. The digital signal (for example, p(t) as in FIG. 10) is stored in the atmospheric pressure data storage unit 1202 and stored therein for at least a certain period of time. Data (for example, x(t), y(t), and z(t) as in FIG. 10) of the signal S4 from the AFM2 are stored in the AFM data storage unit 1203 and stored therein for at least a certain period of time. The atmospheric pressure data storage unit 1202 and the AFM data storage unit 1203 are configured with the memory 202 in FIG. 2 or an external storage device or database (DB) of the computer system CS2.

The correction calculation unit 1204 is implemented by program processing by the processor 201 in FIG. 3. The correction calculation unit 1204 reads data of the atmospheric pressure measurement value p(t) from the atmospheric pressure data storage unit 1202 in units of a predetermined time at a predetermined timing, reads data of the signal S2 from the AFM data storage unit 1203 in units of the same time, and expands these data on the memory. The predetermined timing may be the timing at which the user U1 instructs the execution of the correction based on the operation or the timing determined by the user U1 in advance through the user settings.

The correction calculation unit 1204 collectively performs height correction processing on these data in units of a predetermined time based on the calibration line data 202E in FIG. 2 and obtains height correction processing result data to store the height correction processing result data in the correction result storage unit 1205. This height correction processing result data corresponds to an image after the height information is corrected.

As described above, according to the fourth embodiment, after the measurement by the AFM2 is once performed, the correction of the height information can be performed collectively by the correction processing unit 1200. In this form, real-time correction cannot be performed, but provision of a dedicated circuit is not required.

As described above, embodiments of the present disclosure are not limited to the above-described embodiments, and various modifications can be made without departing from the spirit of the invention. In the surface analysis device, the device to be mounted is not limited to the AFM, and any device capable of acquiring information representing the sample surface shape such as an SPM or an optical surface shape acquisition device can be applied.

REFERENCE SIGNS LIST

1: surface analysis device
2: AFM
2a: first portion
2b: second portion
3: SEM
4: sensor
5: sample
6: stage
7: probe
10: vacuum tank
10a: upper wall part
CS1, CS2, CS3: computer system.

The invention claimed is:

1. A surface analysis device comprising:
an airtight tank having a decompressable or pressurizable interior;
a stage configured to hold a sample within the airtight tank;
a scanning probe microscope fixed to a structure forming the airtight tank and configured to measure a surface of the sample;
a sensor disposed outside the airtight tank and configured to measure an atmospheric pressure; and
a computer system configured to analyze the surface of the sample using a first signal measured by the scanning probe microscope and a second signal measured by the sensor.

2. The surface analysis device according to claim 1,
wherein the scanning probe microscope is fixed to a wall surface of the structure of the airtight tank, and
wherein the computer system uses the second signal to correct height information of the surface of the sample in the first signal.

3. The surface analysis device according to claim 1, wherein the scanning probe microscope is fixed to an upper wall part of the structure of the airtight tank, and has a first portion disposed outside the upper wall part and a second portion including a probe disposed inside the upper wall part.

4. The surface analysis device according to claim 1, wherein the computer system calculates a variation amount in atmospheric pressure from the second signal, calculates a displacement amount of the airtight tank according to the variation amount in atmospheric pressure, and corrects a value of the first signal according to the displacement amount of the airtight tank.

5. The surface analysis device according to claim 1, wherein the computer system corrects a value of the first signal based on a calibration line representing a relationship between a variation amount in atmospheric pressure outside the airtight tank and a displacement amount of the airtight tank.

6. The surface analysis device according to claim 1,
wherein the scanning probe microscope is an atomic force microscope,
wherein the first signal includes height information of the surface of the sample as a measurement signal of the atomic force microscope, and
wherein the computer system uses the second signal to correct the height information of the surface of the sample in the first signal.

7. The surface analysis device according to claim 1, further comprising a charged particle beam device fixed to the structure of the airtight tank and configured to observe the sample.

8. The surface analysis device according to claim 7, further comprising a stage moving mechanism configured to move the stage in the airtight tank,
wherein the stage moving mechanism moves a position of the stage between a first position for measurement by the scanning probe microscope and a second position for observation by the charged particle beam device.

9. The surface analysis device according to claim 8, wherein, after moving the stage to the second position and positioning the position of the sample on the stage based on the observation by the charged particle beam device, the stage moving mechanism moves the stage to the first position to perform the measurement by the scanning probe microscope.

* * * * *